(12) United States Patent
Zalewski

(10) Patent No.: US 8,103,562 B2
(45) Date of Patent: Jan. 24, 2012

(54) SYSTEM AND METHOD FOR PROCESSOR CYCLE ACCOUNTING AND VALUATION

(75) Inventor: Gary M. Zalewski, Oakland, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 576 days.

(21) Appl. No.: 11/696,120

(22) Filed: Apr. 3, 2007

(65) Prior Publication Data

US 2007/0250446 A1  Oct. 25, 2007

(51) Int. Cl.
G06Q 40/00 (2006.01)
G06Q 10/00 (2006.01)
G06F 15/16 (2006.01)

(52) U.S. Cl. ......... 705/31; 705/7.35; 705/400; 709/201; 709/226

(58) Field of Classification Search ............... 705/1, 34, 705/36, 400, 7, 8, 30–32, 307, 329, 7.35; 713/500–503; 709/201–203, 226
See application file for complete search history.

(56) References Cited

U.S. PATENT DOCUMENTS

| | | | |
|---|---|---|---|
| 6,370,560 B1 * | 4/2002 | Robertazzi et al. | 718/105 |
| 6,463,457 B1 * | 10/2002 | Armentrout et al. | 709/201 |
| 6,757,730 B1 * | 6/2004 | Lee et al. | 709/226 |
| 7,370,013 B1 * | 5/2008 | Aziz et al. | 705/40 |
| 7,499,968 B1 * | 3/2009 | Alexander et al. | 709/203 |
| 2001/0013049 A1 * | 8/2001 | Ellis, III | 709/201 |
| 2002/0019844 A1 * | 2/2002 | Kurowski et al. | 709/201 |
| 2002/0133436 A1 * | 9/2002 | Hermreck et al. | 705/31 |
| 2002/0198769 A1 * | 12/2002 | Ratcliff, III | 705/14 |
| 2003/0135380 A1 * | 7/2003 | Lehr et al. | 705/1 |
| 2004/0168170 A1 * | 8/2004 | Miller | 718/104 |
| 2004/0215536 A1 * | 10/2004 | Deliwala et al. | 705/34 |
| 2005/0027863 A1 * | 2/2005 | Talwar et al. | 709/226 |
| 2005/0044228 A1 * | 2/2005 | Birkestrand et al. | 709/226 |
| 2005/0071298 A1 * | 3/2005 | Forman et al. | 705/412 |
| 2005/0131898 A1 * | 6/2005 | Fatula, Jr. | 707/8 |
| 2005/0138175 A1 * | 6/2005 | Kumar et al. | 709/226 |
| 2005/0257079 A1 * | 11/2005 | Arcangeli | 714/4 |
| 2006/0106689 A1 * | 5/2006 | Greenstein et al. | 705/31 |
| 2006/0149652 A1 * | 7/2006 | Fellenstein et al. | 705/35 |
| 2006/0165040 A1 * | 7/2006 | Rathod et al. | 370/335 |
| 2006/0224713 A1 * | 10/2006 | Imai | 709/223 |
| 2006/0225046 A1 * | 10/2006 | Feekes | 717/127 |

(Continued)

FOREIGN PATENT DOCUMENTS

WO  WO 2005006678 A1 *  1/2005

OTHER PUBLICATIONS

Robinson, Researchers Demonstrate Computer Code Can Be Broken, NY Times, Aug. 27, 1999.*

(Continued)

Primary Examiner — John Hayes
Assistant Examiner — Daniel Vetter
(74) Attorney, Agent, or Firm — Blakely, Sokoloff, Taylor & Zafman LLP

(57) ABSTRACT

A system monitors the operations of a programmable processor to determine how much of its time is spent performing a certain task. An estimate of the value of the task is made, and a certificate that reflects the value is issued. Related methods and software are also described.

29 Claims, 2 Drawing Sheets

U.S. PATENT DOCUMENTS

2007/0294663 A1* 12/2007 McGuire et al. .............. 717/108

OTHER PUBLICATIONS

Stanford Univ., Folding@Home Distributed Computing FAQ (WebArchive copy dated Jan. 5, 2004).*

McKean, Tap the Power of Your PC to Fight Cancer, PCWorld.com, Apr. 3, 2001.*

May, Idle Computing Resources as Micro-Currencies—Bartering CPU Time for Online Content, Tech. Univ. Of Munich, Jul. 8, 1999.*

* cited by examiner

SYSTEM AND METHOD FOR PROCESSOR CYCLE ACCOUNTING AND VALUATION

FIELD

The invention relates to distributed data processing networks, and more particularly to administrative procedures related to such networks.

BACKGROUND

Contemporary consumer electronic devices are being delivered with increasingly powerful processing capabilities to meet users' demands. General-purpose computers (i.e. personal computers and laptops) are also becoming more powerful, with larger memories, faster clocks, and shorter operational cycles. Furthermore, devices are more commonly provided with communication facilities that permit them to exchange data with other systems over a distributed data network such as the Internet.

Although the processing limits of these newer, powerful devices may occasionally be reached (e.g. when rendering realistic, three-dimensional scenes, performing detailed simulations or decoding complex multimedia streams), the devices often have computing capacity to spare. In addition, users have become accustomed to leaving devices operating at all times to avoid startup delays. These circumstances have created a surplus of CPU cycles: time periods during which a device could perform a calculation, if only a framework existed to provide the inputs and to retrieve the result.

Distributed data processing applications (also known as "grid computing" applications) have been developed to provide such a framework. While distributed processing is not a feasible approach for all applications, a significant subset of useful projects can be subdivided into independent tasks that require relatively small amounts of input data, produce relatively small amounts of output, and have relaxed (or non-existent) inter-task synchronization requirements. Such projects can take advantage of CPU cycles that would otherwise be lost.

Examples of tasks that can be split up and assigned to nodes participating in a distributed processing network include electromagnetic signal analysis, primality testing, brute-force ciphertext decryption and protein folding simulation. Well-known projects have developed software, suitable for execution on many different types of systems, to perform these tasks. People who have one or more machines with some spare processing capacity can run the software for a project they find interesting. The software coordinates with a project server, obtains "work units" and delivers results. Some projects are able to achieve aggregate processing speeds (typically measured in billions of floating-point operations per second, or "GFLOPS") that are orders of magnitude faster than the speed achievable with a single supercomputer. The remarkable power of these ad hoc distributed processing networks is even more surprising when one considers that the CPU cycles are often donated—the owners of the participating machines receive no monetary benefit for their contribution, despite their costs incurred in acquiring and operating the machines.

Since some of these distributed data processing projects produce scientific data that is of general benefit to society, it would be desirable to encourage greater participation. A method of accounting and evaluating donated processing resources can provide a foundation for establishing incentives directed toward that end.

SUMMARY

Computing system operations are monitored to measure the amount of time, energy, or processor cycles devoted to a task. A dynamic estimate of the value of such work is prepared and used to establish a valuation for the work performed. This valuation may serve as the basis to monetize grid-computing services or for a claim of reimbursement or credit against a liability or for the promotion of tax-free donations of CPU cycles.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Operations of nodes in a distributed data processing network are monitored to determine how much work a node performs. The equivalent value of this work is estimated based on one or more models, and a verification of the work and estimated value is transmitted to an administrator of the node. The verification may serve as the basis of a claim for reimbursement or credit against a liability.

Figure 1:
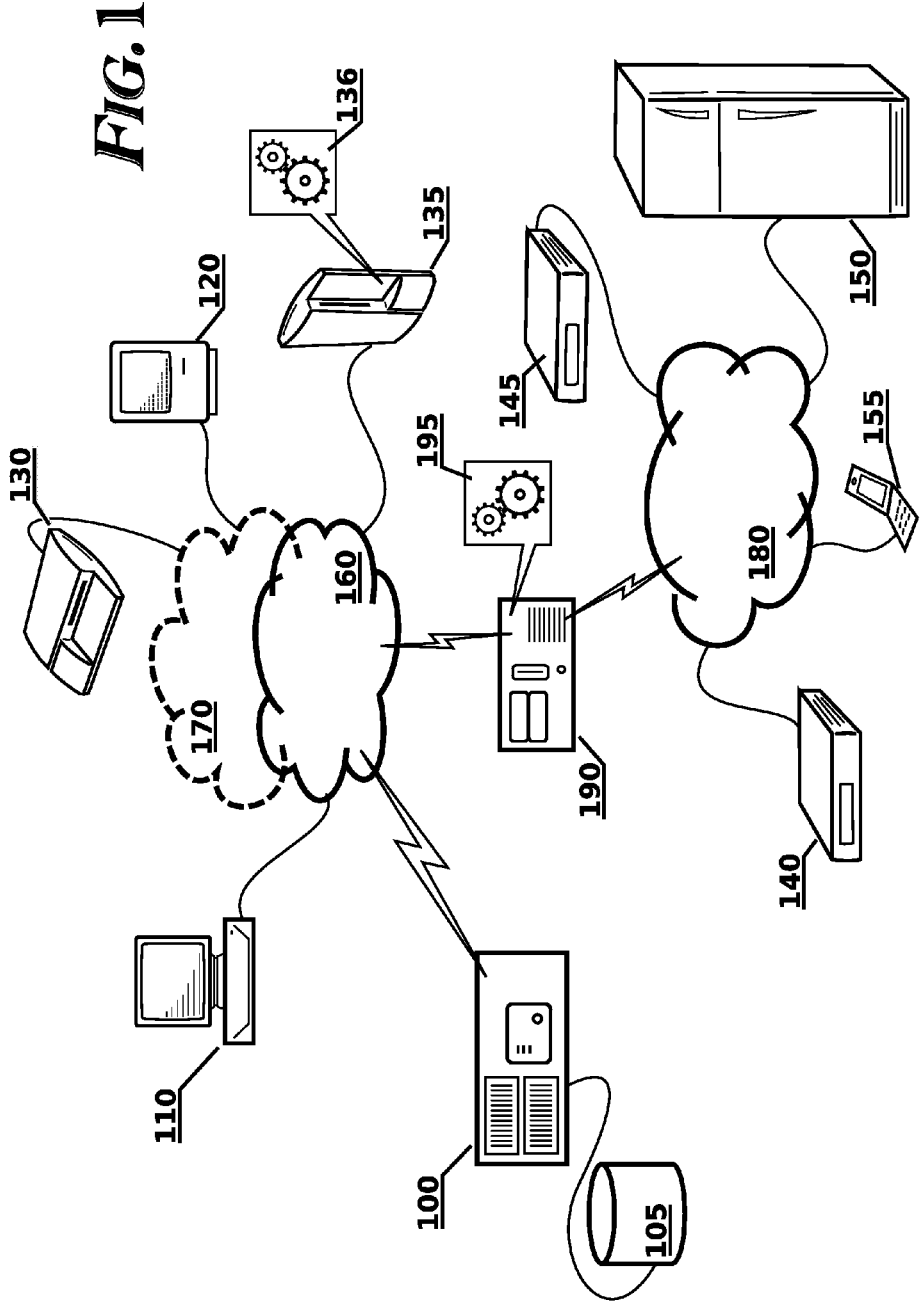
FIG. 1 shows a group of computing devices that communicate over networks to participate in a distributed data processing project.

FIG. 1 shows an example distributed data processing environment. Many different systems 110, 120, 130, 135, 140, 145, 150 connect to a wide-area communication network such as the Internet 160, a virtual private network ("VPN") 170 whose data is encrypted and carried over a public network, or an independent network 180. As suggested earlier, and indicated in this figure, a wide variety of device types can participate in a system according to an embodiment of the invention: an ordinary workstation 110, personal computer 120, game consoles 130 and 135, cable television set-top boxes ("STBs") 140 and 145, and even network-enabled appliances such as refrigerator 150 and cellular telephone 155 can contribute CPU cycles.

Each participating device executes software to perform part of a distributed data processing task. Devices receive input data from a coordinating entity 100, which parcels out tasks to be executed and collects output results into a database 105. Logic to perform the methods of an embodiment of the invention may be implemented by software 136 executing at a participating node, or by software 195 at a gateway node 190 that provides an interface between the coordinating entity 100 and devices 140, 145, 150 that may not enjoy direct communication with the coordinator.

Figure 2:
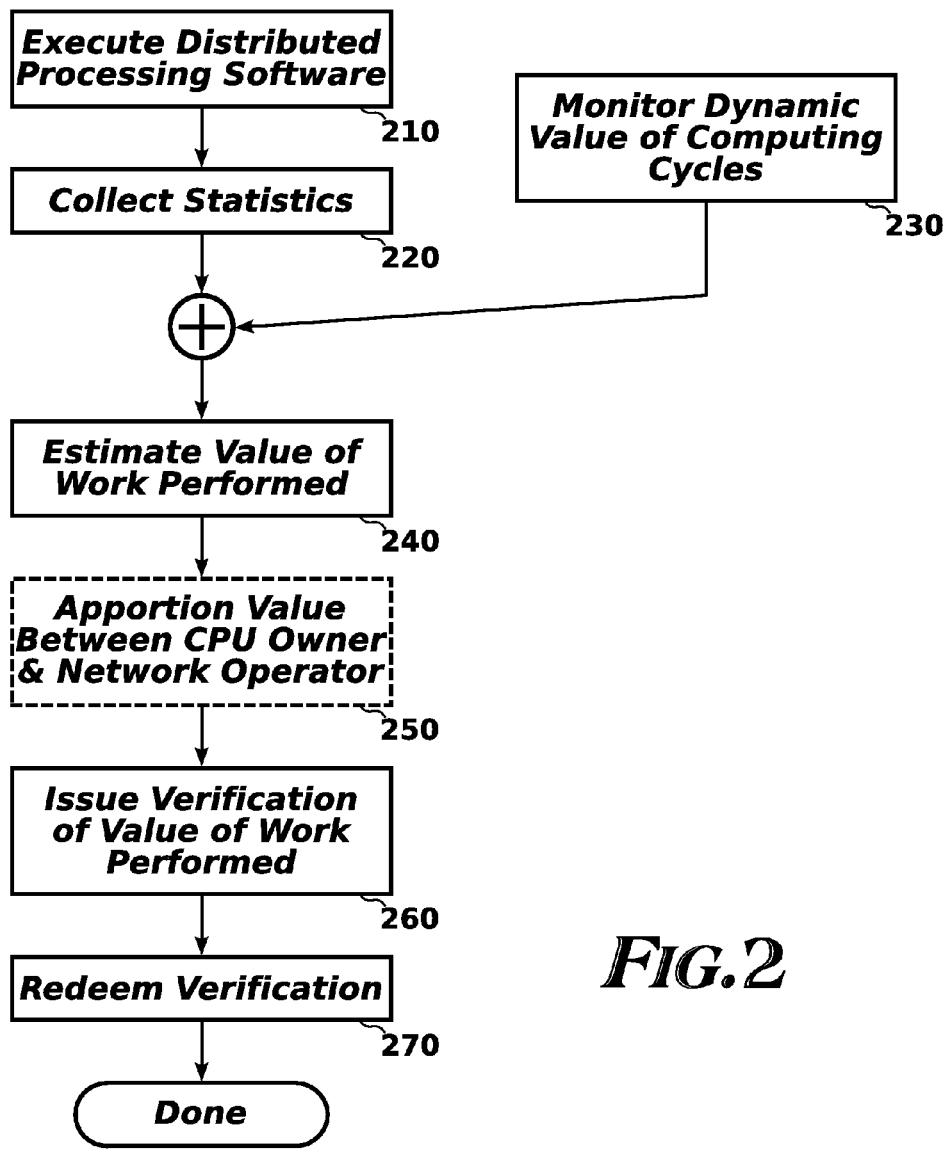
FIG. 2 outlines a method of accounting and evaluating processing work according to an embodiment of the invention.

FIG. 2 outlines a method according to an embodiment of the invention. The owner or operator of a computing resource causes the processor to begin executing a distributed data processing application (210). These applications are often designed to run at a lower priority than the device's other tasks, so computations may only be performed if the device would otherwise be idle. The application may interact with a coordinating authority to obtain work assignments and to deliver results. In some embodiments, a gateway may be required to bridge a protocol or network discontinuity between the device and the coordinator. For example, a set-top box may be unable to communicate with an arbitrary Internet-attached server via a Transmission Control Protocol/Internet Protocol ("TCP/IP") connection; instead, the STB may use a special protocol to communicate with a head-end media distribution server. This server may also serve as a proxy agent to permit the STB to communicate with the distributed data processing application coordinating authority.

Statistics relating to the computing resource's execution of distributed data processing tasks are collected (220). These statistics may be collected by hardware or software logic within the resource itself, or by a separate system that can monitor at least some of the resource's activities. For example, a CPU-time accounting system may be able to distinguish between CPU cycles devoted to the distributed data processing application and cycles that perform other tasks. Alternatively, process accounting logic may examine network traffic between the computing resource and the coordinating authority to monitor work units delivered to the computing resource and results returned therefrom.

A process that may operate independently of the computing resource and statistics collection mechanisms dynamically monitors the value of computation services (230). The value may be calculated or estimated based on one or more predicate measurements, several of which are discussed below.

The resource-specific statistics collected earlier are combined with the dynamic computation services value and an estimate is made of the value of the work performed (240). In some embodiments, the estimated value is apportioned (250) between the actual computational services performed by the resource and support services provided by an operator of a network or other facility without which the computing resource could not participate.

Verification of the estimated value of work performed is issued to the owner or operator of the computing resource (260). Verification may take the form of a paper receipt, an electronic certificate, or another similar token showing the bases for the stated valuation. Finally, the recipient of the verification redeems the verification (270). For example, the verification may be exchanged for cash, goods or services; or it may be submitted to a local or national taxation board as evidence of a corresponding charitable contribution.

A number of distributed data processing projects are currently ongoing, and software to allow various types of processors to participate is freely available. The tasks that are distributed vary in nature and complexity. For example, a participating processor ("worker node") may test a set of numbers to determine whether any of the numbers is prime, or may work to find factors or partial factors of a potentially-prime number. Worker nodes may test decryption keys by decrypting a ciphertext and delivering the decrypted text (or a synopsis thereof) for further analysis. One popular distributed processing project called "Folding@Home" provides software to simulate the three-dimensional self-arrangement of a series of amino acids ("protein folding"). Data gathered through this simulation may help in understanding diseases and/or in developing new drugs and treatments.

Software to permit a worker node to perform part of the processing on a distributed problem is typically developed and distributed by an organizing entity that wishes to investigate the problem and is willing to coordinate the distribution of work and analysis of results. Various types of machines, processors and operating system software may require individualized versions of worker software, so project coordinators may have to exert considerable effort to prepare the software. To obtain the best results for their efforts, popular and/or powerful machines and systems may be supported first. For example, many personal computers use Intel® or AMD® processors, and run a version of the Microsoft Windows™ operating system. This combination of processor and operating system is often supported.

In addition to ordinary personal computers and workstations, some other devices have formidable processing capabilities. For example, many graphics adapters ("video cards") contain a programmable processor that can perform certain types of floating point operations quickly. Thus, although such an adapter is usually thought of as merely a subsystem of a general-purpose computer, and relied upon to calculate data and produce a video signal to drive a display, the graphics processing unit ("GPU") can also be programmed to perform tasks for a distributed data processing project.

Special-purpose machines may also have programmable processors that are well-suited to performing the kinds of calculations that often appear in a distributed data processing task. For example, the Sony Playstation 3™ ("PS3") game console contains a Cell processor that can perform eight simultaneous floating point operations. (A typical CPU of a personal computer or minicomputer may only be able to perform one or two floating point operations per machine cycle.) Thus, when a game console such as a PS3 is not simulating a three-dimensional game environment, its idle cycles may be quite valuable for performing distributed data processing tasks.

Even devices that are not typically thought of as computing systems may be able to participate in a computing grid. For example, although cellular telephones are not known for having powerful processors, the sheer number of cell phones that could perform some portion of a task may make it reasonable to provide software to harness their idle cycles.

Embodiments of the invention monitor the time or number of processing cycles devoted to performing distributed data processing computations, and can estimate the value of work done according to several different methods. The methods may be divided into two general categories: valuations based on the cost to perform the work (e.g. equipment and operational costs), and valuations based on the cost to obtain a similar amount of work from a different source ("replacement value"). One method is to multiply the percentage or fraction of CPU time or cycles devoted to the distributed task by the depreciation and/or operating cost the computing device. For example, if a device depreciates at $100 per year and performs distributed computations 70% of the time, the value of the work done may be assessed at $70.

Depreciation for consumer electronic devices may be difficult to determine, or may make the device theoretically worthless after a short time, so another method of valuing the work is to multiply the amount of time spent performing the work by the cost to operate the device (e.g. the cost of electricity, network access, and similar expenses). Such a valuation can be made more accurate by accounting for fluctuations in electrical costs by time of day, etc. However, these two methods fail account for factors such as the efficiency of the device and its processing speed. Ironically, the "depreciation" or "power" methods of valuation may assign greater value to work done by slow, expensive, power-hungry devices than work done by fast, inexpensive and efficient ones.

Another method of valuation may assess the work done in comparison to an objective measurement such as the amount of work a particular reference supercomputer could perform in the same amount of time. For example, if the supercomputer could perform 1,000 units of work per hour, then a device that can perform one unit of work per hour may be ¹⁄₁₀₀₀ as valuable. If the device performs 1,000 hours of work over the course of a year, the work may be valued comparably to the cost of renting or operating the supercomputer for an hour. It is appreciated that the cost of renting and/or operating a supercomputer may vary throughout the day and the year (e.g. nighttime and weekend processing time may be less expensive than daytime processing; and the release of a faster supercomputer may reduce the cost to rent the reference supercomputer.) An embodiment of the invention may track the cost of operating a reference supercomputer throughout the year, and estimate the value of work done by a computing device in relation to the speed of the device and the fractional cost for an equivalent amount of processing by the reference supercomputer.

Some valuation methods may take into account other information as well. For example, in addition to the "cost to provide" or "cost to replace" valuations discussed above, an embodiment may discount the value of a computing system's work when the "supply" of comparable idle cycles from other grid participants is high. Thus, for example, if many PS3 game systems are idle during school hours, the value of their cycles may be reduced because of an excess supply. On the other hand, when most game systems are busy (e.g. evenings and weekends), those that still have idle cycles to perform distributed tasks may be valued more highly.

As mentioned above, in some embodiments, an intermediate gateway system stands between the system that coordinates the distributed data processing project and the computing devices that perform assigned tasks. (In other embodiments, no protocol- or network-interface functions need be performed by such a gateway system, but a system occupying a similar logical position may nonetheless be provided, and may perform the other functions discussed here.)

The gateway system may act as a proxy between the distributed project coordinator and a group of computing devices. The gateway may request work on behalf of the computing devices and return results to the coordinator. By passing work and results back and forth, the gateway is positioned to measure the amount of processing completed, and can calculate the rate of processing based on the time elapsed. Furthermore, rather than requiring each client system individually to obtain data to estimate the value of its work, the gateway can collect the necessary data and perform valuations for all of the clients. For example, the gateway can track electricity rates at its clients' locations and use this information to produce a "cost-to-provide" valuation estimate, or monitor supercomputer speeds and costs, and use the information to produce a "cost-to-replace" valuation.

The gateway may also issue certificates showing the value of work performed by each computing device. For example, an electronic mail message may be transmitted, or a paper receipt for services rendered may be mailed to an owner or operator of each device. In a preferred embodiment, the certificate shows a value including a portion attributable to the cost of electricity and a portion representing capital-asset depreciation.

When a gateway provides support services to a group of computers, as described here, the value of work performed by the computers may be apportioned into at least two parts: the value of the work itself, and the value of the support services that facilitated the work. Thus, the gateway's services can also be assigned a value, and a certificate reflecting the value may be issued to the operator of the gateway. (The remainder of the work value may be divided among the participating computers based on the percentage of the work each computer performed, possibly adjusted based on temporal fluctuations in the value of the work.)

An embodiment of the invention may be a machine-readable medium having stored thereon instructions which cause a programmable processor to perform operations as described above. In other embodiments, the operations might be performed by specific hardware components that contain hard-wired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and [Electrically] Erasable Programmable Read-Only Memory ([E]EPROM).

The applications of the present invention have been described largely by reference to specific examples and in terms of particular allocations of functionality to certain hardware and/or software components. However, those of skill in the art will recognize that an accounting and valuation of computer processing services can also be produced by software and hardware that distribute the functions of embodiments of this invention differently than herein described. Such variations and implementations are understood to be captured according to the following claims.

I claim:

1. In a processor based system, having one or more computing systems, each computing system having a corresponding processor, a method comprising:
monitoring, by a gateway machine node, a plurality of cycles of a programmable processor in the processor based system to determine a number of the cycles that are performed to execute a predetermined distributed computing task via the processor based system;
estimating a value, by the gateway machine node, of the determined number of cycles that are performed to execute the predetermined distributed computing task, wherein estimating the value comprises:
establishing a valuation ratio, by the gateway machine node, for the determined number of cycles based on a comparison of the determined number of cycles to a number of work units performable by a reference computer available for rent,
establishing the estimated value, by the gateway machine node, for thedetermined number of cycles based on the established valuation ratio for the determined number of cycles in comparison to a cost of renting the reference computer, and
apportioning the estimated value between actual determined number of cycles performed, by the processor of the processor based system, and support services performed by an operator of a network for the processor based system;
discounting the apportioned estimated value of the cycles that are performed by the processor, when a supply of available number of cycles for the predetermined distributed computing task is higher than a supply of the determined number of cycles to execute the predetermined distributed computing task;
issuing, by the gateway machine node, a plurality of certificates to memorialize the discounted apportioned estimated value of the determined number of cycles that are performed for each computing system within the processor based system, wherein the plurality of certificates includes a certificate of charitable contribution for submission to a local or national taxation board; and submitting the certificate of the charitable contribution to the local or national taxation board.

2. The method of claim 1, wherein establishing the estimated value for the determined number of cycles is based further on an asset depreciation rate for the processor based system.

3. The method of claim 1, wherein the predetermined distributed computing task is searching a set of numbers to find a prime number.

4. The method of claim 1, wherein the predetermined distributed computing task testing an encryption key to decrypt a ciphertext message.

5. The method of claim 1, wherein the predetermined distributed computing task is simulating a protein fold.

6. The method of claim 1, wherein the plurality of cycles comprises a first number of cycles corresponding to the determined number of cycles that are performed to execute the predetermined distributed computing task, and wherein the plurality of cycles further comprises a second number of cycles of the programmable processor corresponding to a number of cycles that are performed to simulate a three-dimensional game environment.

7. The method of claim 1, wherein the plurality of cycles comprises a first number of cycles corresponding to the determined number of cycles that are performed to execute the predetermined distributed computing task, and wherein the plurality of cycles further comprises a second number of cycles of the programmable processor that are performed to calculate a portion of a video display signal.

8. The method of claim 1, wherein estimating the value further comprises:

multiplying a total cost of electrical power by a fraction composed of the number of cycles that are performed to execute the predetermined distributed computing task and a total number of cycles in the plurality of cycles; and wherein establishing the estimated value for the determined number of cycles is based further on the cost of electrical power multiplied by the fraction.

9. The method of claim 1, wherein the certificate is a receipt for services rendered, and wherein the method further comprises declaring the value as a charitable donation.

10. The method of claim 1, wherein the computer system includes:

a CELL processor configured to perform eight simultaneous floating point operations;
a cellular telephone;
a graphics processing unit;
an INTEL processor; and
an AMD processor.

11. The method of claim 1, wherein the reference computer comprises a reference supercomputer which is tracked throughout a period of time to determine a cost of operating the reference supercomputer.

12. The method of claim 11, wherein the period of time is one year.

13. The method of claim 1, wherein the plurality of certificates includes a certificate showing a value with a portion attributable to cost of electricity and a portion representing capital-asset depreciation, and wherein the method further comprises:

transmitting, in an electronic form, the certificate showing the value with the portion attributable to the cost of electricity and the portion representing capital-asset depreciation.

14. The method of claim 1, wherein the plurality of certificates includes a certificate showing the value apportioned to support services provided by the operator, and wherein the method further comprises:

issuing the certificate, showing the value apportioned to support services, to the operator of the network.

15. A non-transitory computer readable storage medium having instructions stored thereon that, when executed in a processor based system having one or more computing systems, each computing system having a corresponding processor, the instructions cause the processor based system to perform a method comprising:

monitoring a plurality of cycles of a programmable processor in the processor based system to determine a number of the cycles that are performed to execute a predetermined distributed computing task via the processor based system;

estimating a value of the determined number of cycles that are performed to execute the predetermined distributed computing task, wherein estimating the value comprises:

establishing a valuation ratio for the determined number of cycles based on a comparison of the determined number of cycles to a number of work units performable by a reference computer available for rent, and establishing the estimated value for the determined number of cycles based on the established valuation ratio for the determined number of cycles in comparison to a cost of renting the reference computer, and apportioning the estimated value between actual determined number of cycles performed, by the processor of the processor based system, and support services performed by an operator of a network for the processor based system;

discounting the apportioned estimated value of the cycles that are performed by the processor, when a supply of available number of cycles for the predetermined distributed computing task is higher than a supply of the determined number of cycles to execute the predetermined distributed computing task;

issuing a plurality of certificates to memorialize the discounted apportioned estimated value of the determined number of cycles that are performed for each computing system within the processor based system, wherein the plurality of certificates includes a certificate of charitable contribution for submission to a local or national taxation board; and submitting the certificate of the charitable contribution to the local or national taxation board.

16. The non-transitory computer readable storage medium of claim 15, wherein establishing the estimated value for the determined number of cycles is based further on an asset depreciation rate for the processor based system.

17. The non-transitory computer readable storage medium of claim 15, wherein the predetermined distributed computing task is selected from a group of predetermined distributed computing tasks consisting of;

searching a set of numbers to find a prime number;
testing an encryption key to decrypt a ciphertext message; and
simulating a protein fold.

18. The non-transitory computer readable storage medium of claim 15, wherein the plurality of cycles comprises a first number of cycles corresponding to the determined number of cycles that are performed to execute the predetermined distributed computing task, and wherein the plurality of cycles further comprises a second number of cycles of the programmable processor corresponding to a number of cycles that are performed to simulate a three-dimensional game environment.

19. The non-transitory computer readable storage medium of claim 15, wherein estimating the value further comprises:
   multiplying a total cost of electrical power by a fraction composed of the number of cycles that are performed to execute the predetermined distributed computing task and a total number of cycles in the plurality of cycles; and
   wherein establishing the estimated value for the determined number of cycles is based further on the cost of electrical power multiplied by the fraction.

20. The non-transitory computer readable storage medium of claim 15, wherein the certificate is a receipt for services rendered, and wherein the method further comprises declaring the value as a charitable donation.

21. The non-transitory computer readable storage medium of claim 15, wherein the computer system includes:
   a CELL processor configured to perform eight simultaneous floating point operations;
   a cellular telephone;
   a graphics processing unit;
   an INTEL processor; and
   an AMD processor.

22. The non-transitory computer readable storage medium of claim 15, wherein the reference computer comprises a reference supercomputer which is tracked throughtout a period of time to determine a cost of operating the reference supercomputer.

23. The non-transitory computer readable storage medium of claim 22, wherein the period of time is one year.

24. The non-transitory computer readable storage medium of claim 15, wherein the plurality of certificates includes a certificate showing a value with a portion attributable to cost of electricity and a portion representing capital-asset depreciation, and
   wherein the non-transitory computer readable storage medium includes further instructions that, when executed by the processor based system, the instructions cause the processor based system to perform a further method comprising:
   transmitting, in an electronic form, the certificate showing the value with the portion attributable to the cost of electricity and the portion representing capital-asset depreciation.

25. The non-transitory computer readable storage medium of claim 15, wherein the plurality of certificates includes a certificate showing the value apportioned to support services provided by the operator, and
   wherein the non-transitory computer readable storage medium includes further instructions that, when executed by the processor based system, the instructions cause the processor based system to perform a further method comprising:
      issuing the certificate, showing the value apportioned to support services, to the operator of the network.

26. A system having one or more computing systems, each computing system having a corresponding processor, comprising:
   a memory to store instructions and data;
   a cell processor capable of performing a plurality of simultaneous floating point operations and coupled with the memory;
   wherein the cell processor comprises a plurality of cycles, a first number of the plurality of cycles to simulate a three-dimensional game environment, and a second number of the plurality of cycles to execute a predetermined distributed computing task; and
   wherein the instructions, when executed by the system, cause the system to;
   monitor, by a gateway machine node, a plurality of cycles of a programmable processor in the processor based system to determine a number of the cycles that are performed to execute a predetermined distributed computing task via the processor based system;
   estimate a value, by the gateway machine node, of the determined number of cycles that are performed to execute the predetermined distributed computing task, wherein estimating the value comprises:
   establish a valuation ratio, by the gateway machine node, for the determined number of cycles based on a comparison of the determined number of cycles to a number of work units performable by a reference computer available for rent,
   establish the estimated value, by the gateway machine node, for the determined number of cycles based on the established valuation ratio for the determined number of cycles in comparison to a cost of renting the reference computer, and
   apportion the estimated value between actual determined number of cycles performed, by the processor of the processor based system, and support services performed by an operator of a network for the processor based system;
   discounting the apportioned estimated value of the cycles that are performed by the processor, when a supply of available number of cycles for the predetermined distributed computing task is higher than a supply of the determined number of cycles to execute the predetermined distributed computing task;
   issue, by the gateway machine node, a plurality of certificates to memorialize the discounted apportioned estimated value of the determined number of cycles that are performed for each computing system within the processor based system, wherein the plurality of certificates includes a certificate of charitable contribution for submission to a local or national taxation board; and
   submit the certificate of the charitable contribution to the local or national taxation board.

27. The system of claim 26, wherein the estimated value for the determined number of cycles is based further on an asset depreciation rate for the system.

28. The system of claim 26, wherein the predetermined distributed computing task is selected from a group of predetermined distributed computing tasks comprising:
   searching a set of numbers to find a prime number;
   testing an encryption key to decrypt a ciphertext message; and
   simulating a protein fold.

29. The system of claim 26, wherein the estimated value is based further on:
   a total cost of electrical power multiplied by a fraction composed of the number of cycles that are performed to execute the predetermined distributed computing task and a total number of cycles in the plurality of cycles.

* * * * *